April 9, 1929.  F. PERDUE  1,708,430
ELECTRICAL SIGNALING SYSTEM
Filed Jan. 25, 1926
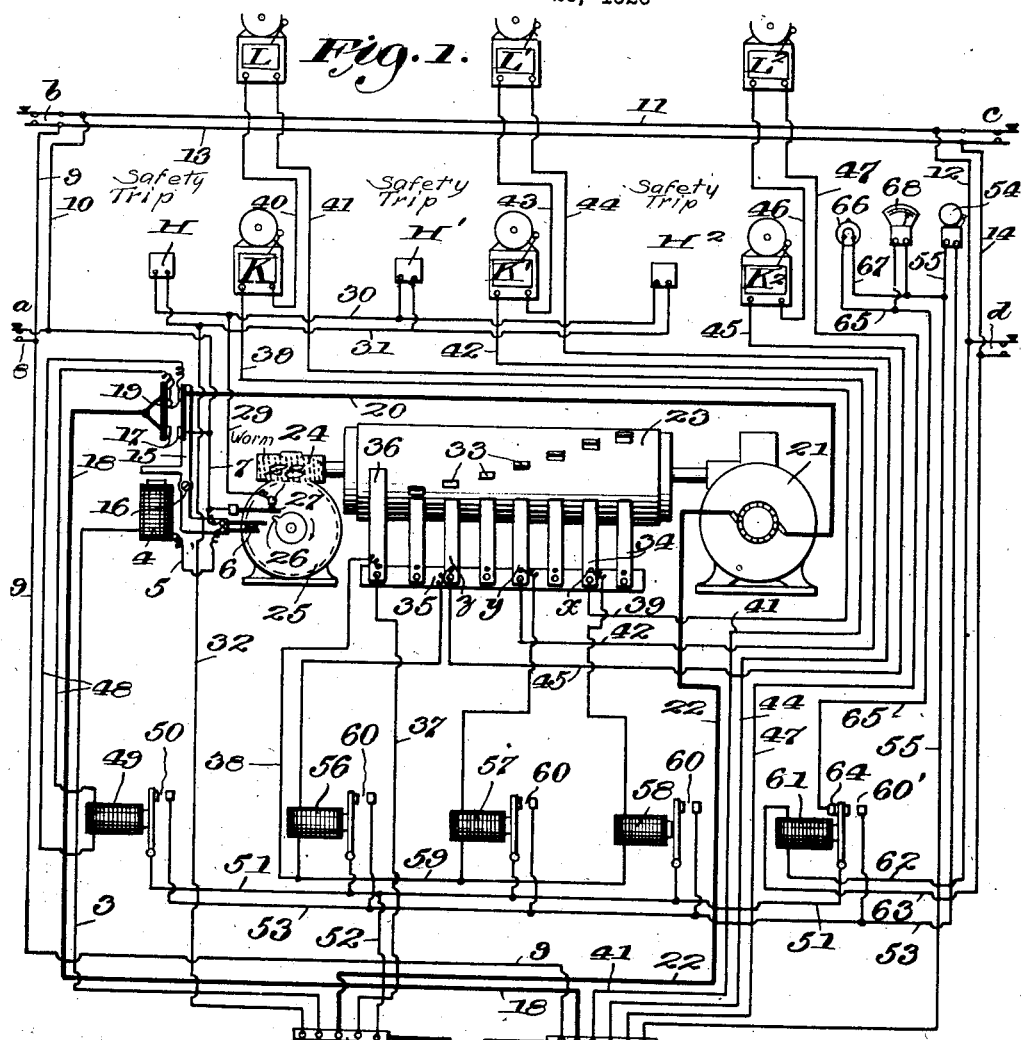
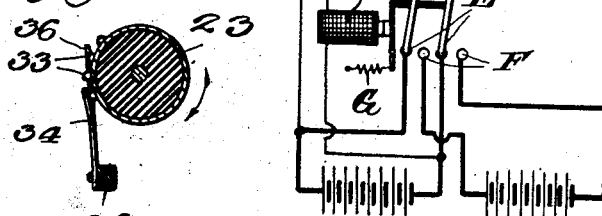
Inventor
Fergus Perdue,
By
Attorney Patented Apr. 9, 1929.

1,708,430

UNITED STATES PATENT OFFICE.

FERGUS PERDUE, OF ROCHESTER, NEW YORK.

ELECTRICAL SIGNALING SYSTEM.

Application filed January 25, 1926. Serial No. 83,671.

This invention relates to electric signaling systems, and more particularly to systems to be installed in large buildings for the purpose of giving a general alarm in the case of fire.

The object of the invention, broadly speaking, may be said to be to provide a simple and effective signaling system of the above type, operating on the open circuit principle, but in which all of the circuits are electrically supervised, so that any break in their continuity or integrity will be immediately indicated.

Among the more specific objects of the invention are to provide a system in which the supervision is effected by means of the same source of current that operates the signaling devices, in which stations of the simple push button type, free from all clockwork or the like, may be employed to initiate the signals, and in which, after a predetermined round of signals has been given, the entire system automatically restores itself to normal, ready for a new operation, without the necessity for any manual resetting whatever.

Still other objects and advantages of the invention will appear from the following description.

In order that the invention may be readily understood, reference is had to the accompanying drawing, forming part of this specification, and in which:—

Figure 1 is a diagram showing the various circuits arranged in accordance with the invention, and conventionally indicating the different pieces of apparatus employed in connection with such circuits; and Figure 2 is a transverse section through the control drum, showing how the contact fingers co-operate therewith.

Referring to the drawing in detail, A and B represent two batteries or other sources of current for operating my improved system. One of these batteries, such as A, is normally connected in circuit through a double pole switch C to a pair of bus bars 1 and 2. The switch C is normally held in engagement with the terminals E of battery A by means of a magnet D, which magnet is connected across the terminals of the battery A. In the event of failure of this battery, the magnet D becomes deenergized, and releases its armature, whereupon a spring G connected to such armature serves to automatically shift the switch C over into engagement with the terminals F of battery B. It will thus be seen that battery A normally supplies current to the system while battery B is maintained in reserve as a spare, and is automatically thrown into the circuit upon failure of battery A. This arrangement insures a constant supply of current to the system at all times.

The signaling system is under the direct control of a master relay 4, one side of this relay winding being connected by a wire 3 with the bus bar 1 and the other side being connected by wires 5 and 7 through a circuit closer 8 with a wire 9 which extends to the other bus bar 2. Included between the wires 5 and 7 is a circuit interrupter comprising a pair of contacts 6, the purpose and operation of which will be hereinafter described. The circuit closer 8 is shown as of the ordinary push button type and is normally open. It constitutes a control station by which the signal system is thrown into operation. Such circuit closer may be manually operated, or may be arranged to be automatically closed upon the breaking of the glass in the station box. In either event, it will be understood that this circuit closer remains closed only momentarily and immediately opens again.

It will be understood that a plurality of these circuit closers are employed and are arranged at any desired number of stations. Four such stations designated a, b, c and d are shown in the drawing. One side of the circuit closer at each station is connected by wires 10, 11 and 12 to the wire 7, and the other side of each circuit closer is connected by wires 13 and 14 with the wire 9. Thus, the wires 7 and 9 constitute the common control wires across which are connected the circuit closers at all of the stations.

From the above, it will be understood that the momentary closing of the circuit closer at any station will result in completing the circuit through wires 3, 5, 7 and 9, such circuit including the master relay 4. Energization of this relay causes it to attract its armature 15, which armature carries one of a pair of contacts 17. The other of the pair of contacts 17 is connected by a wire 18 with the bus bar 2, so that when the contacts 17 are brought together by the energization of the relay 4, a circuit is established through the wires 3, 5 and 7, contacts 17 and wire 18, which serves to maintain the energization of the relay 4, after the station circuit closer has opened, and the contacts 17 are held together so long as the relay 4 remains energized.

The armature 15 also carries one of a pair of contacts 19, one of which is connected to the wire 18, and the other of which is connected by means of a wire 20 with an electric motor 21, the other terminal of such motor being connected by wire 22 with the bus bar 1. Thus, when the contacts 19 are brought together by the energization of relay 4, the circuit of motor 21 is closed, and the motor begins to rotate.

The motor 21 drives, through suitable gearing, a contact drum 23. This preferably consists of a cylinder of insulating material surrounded by a metallic sleeve or jacket, which sleeve carries a series of projecting contact fingers 33, as shown in Figure 2.

The other end of the drum shaft carries a worm which is enclosed in a housing 24, and which meshes with a worm wheel enclosed in a housing 25. On the shaft of this worm wheel is an arm or lug 26 which normally occupies the position shown in the drawing. It will be noted that when the armature 15 is rocked on its pivot 16, by the energization of the relay 4, as above described, the circuit interrupter 6 will be projected toward the shaft of the worm wheel and the upper member thereof will occupy a position in the path of movement of the arm or lug 26. Therefore, when the upper member of such circuit interrupter is engaged by the arm 26, as it rotates in a clockwise direction, the contacts will be separated and the circuit through the relay 4 will be broken, the relay de-energized, and the parts restored to normal position.

The initial movement of the arm 26 from the normal position shown in the drawing, however, brings it into engagement with a contact spring 27 in such a manner as to force this spring against a fixed contact 28, connected by a wire 29 with a common wire 30. A second common wire 31 is connected by means of a wire 32 with the bus bar 1 and a plurality of translating devices H' and H² are bridged across the wires 30 and 31. The contact spring 27 being connected with the wire 7, it will be obvious that when the contact members 27 and 28 are brought together as described, a circuit will be established from bus bar 2 through wire 18, contacts 17 and wires 7, 29 and 32, through the several translating devices connected across the wires 30 and 31.

The apparatus designated by the reference characters H, H¹ and H² are what I designate broadly by the term "safety devices." They may consist of automatic door or window opening or closing means, automatic motor controllers, engine stops, fire shutter releases, etc. Moreover, one of these devices may consist of an arrangement of tripping an ordinary call box connected with the usual city fire alarm circuits. It will be understood that the contacts 27 and 28 are closed only momentarily as the arm 26 sweeps by them, and that therefore, the devices H¹, H² must necessarily be in the nature of trips or relays which serve simply to initiate some operation or control some mechanism.

Arranged to cooperate with the contacts 33 projecting from the control drums 23 are a series of contact fingers 34, suitably mounted upon an insulating support 35. Another contact finger 36 bears constantly upon the contact drum 23 and is connected by wire 37 with the bus bar 1. The contact fingers 34 are individually connected to wires controlling various signaling devices. Some of these connections are shown in the drawing, others being omitted for the sake of clearness, but it will be understood, of course, that any desired number of contact fingers and single circuits can be employed. One of the contact fingers, designated $x$, is connected by wires 39 and 40, with signaling devices K and L, the return wire 41 from these devices being connected to the bus bar 2. Another contact finger designated $y$ is connected through wires 42 and 43 with signaling devices K¹ and L¹, the return wire 44 from which is also connected to the bus bar 2. Similarly, another contact finger, designated $z$, is connected by wires 45 and 46 with signaling devices K² and L², the return wire 47 from which is likewise connected to the bus bar 2. Thus, it will be seen that as the contact drum 23 revolves, the contacts 33 are brought into engagement with the fingers 34 and circuits are established for limited times from the bus bar 1 through wire 37, contact finger 36, contact fingers 34 and the various circuits just traced, through all of the signaling devices. Preferably the contacts 33 are arranged spirally on the drum, as shown, so that the signaling devices are brought into circuit successively, thus avoiding the heavy load on the battery which would be produced if all of the signaling devices were simultaneously connected.

It will be understood that the contacts conventionally illustrated at 33 may be of any desired length or character. Ordinarily, however, a simple closure of the circuit, lasting for a relatively short period of time, such, for example, as a fraction of a minute, will be satisfactory.

The operation of the system as a whole will now be briefly reviewed. It will be understood that the stations $a$, $b$, $c$ and $d$ are preferably located in the corridors or in certain rooms of the building to be protected. The safety devices H, H¹, H² are of course located at different points of the building adjacent the apparatus to be controlled, while the signaling devices K and L are distributed, through the different rooms. Upon the occurrence of a fire, the person discovering it will immediately operate the circuit closer 8 of the nearest station, and this, as above described, will result in the energization of relay 4 and the closing of contacts 17 and 19, thus setting the motor 21 into operation. The first effect of this is to close the contacts 27 and 28 and thus operate the trips of safety devices H. Further rotation of the drum results in bringing the contacts 33 successively into engagement with the fingers 34, thus closing the respective signal circuits for definite periods of time, and sounding the alarm in the various rooms of the building. The drum will continue to rotate, thus sending in a number of rounds of signals or alarms. After a certain number of revolutions of the drum, the worm wheel in the housing 25 will have carried the arm 26 around into a position where it engages and opens the circuit interrupter 6. This deenergizes the relay 4 and restores the parts to their normal position, opening the motor circuit and causing the arm 26 to come to rest in approximately the position shown in the drawing. The system is thereupon ready for a new operation, without the necessity of resetting any of the parts, and a second actuation of the circuit closer at any of the stations will again throw the system into operation and cause another series of alarms to be given.

Open circuit systems of signaling, especially for fire alarms, are looked upon with disfavor because of their liability to failure. That is to say, with an ordinary open circuit system, there is nothing to show whether the circuits are intact, whether the source of current is operative, or whether the system would work properly if an attempt were made to use it. To overcome these defects of an open circuit system, and to create a system having all of the safeguards and advantages of the usual closed circuit arrangement employed for fire alarms, I have devised a method of electrically supervising all of the circuits included in my improved system. This electrical supervision is so designed as to indicate at all times any interruption or break in the continuity of a circuit and also to show whether or not the source of current is constantly in operative condition.

To this end, I provide a number of supervisory relays. The first of these is designated by the reference character 49, and is connected by wires 48 to the contacts 19, included in the motor circuit. Current normally flows, therefore, through the wires 18 and 48 and thence through the motor circuit 20 and 22, thus constantly energizing the relay 49, holding its armature in retracted position, and keeping the contacts 50 open.

In addition to the relay 49, a set of supervisory relays is employed in connection with the various signaling circuits, these relays being designated 56, 57 and 58. One side of the windings of these relays is connected directly with the signal circuits 45, 42 and 39, respectively, and the other side of the windings of these relays is connected to a common wire 59, which is connected by wires 38 and 37 with bus bar 1. Inasmuch as the other terminals of the signaling circuits are connected to bus bar 2, there will be a constant flow of current through the windings of the supervisory relays 56, 57 and 58, and through all of the signaling circuits. It may be here stated that all of the supervisory relays are of relatively high resistance, so that but a very small amount of current flows therethrough. In the case of the signaling circuits, the amount of current flowing through the relays 56, 57 and 58 is not sufficient to operate the signaling devices K and L.

Still another supervisory relay designated by the reference character 61, is connected across the common wires 12 and 14, which extend to all of the signal stations. Thus, current constantly flows through the wire 3, relay 4, wires 5, 7, 10, 11 and 12 through the relay 61 and thence back through wires 14, 13, and 9, to the bus bar 2; and this current will continue to flow so long as there is no break in the continuity of the station circuits. Here, again, the resistance of the relay 61 is so high that the current flowing in the circuit above traced is not sufficient to energize the master relay 4.

As above stated, the relay 49 controls a pair of contacts 50. Similarly, each of the relays 56, 57 and 58 controls a pair of contacts 60, and the relay 61 controls a pair of contacts 60'. All of these pairs of contacts are connected across two common wires 51 and 53, the former of which is connected by wire 52 to bus bar 1 and the latter of which extends to one side of a suitable bell or other audible alarm 54. The other terminal of this alarm is connected by wire 55 with the bus bar 2. Thus, upon failure of any of the supervisory circuits above described, and upon de-energization of any of the supervisory relays, one of the pairs of contacts 50, 60, or 60' will be closed, thus automatically completing a circuit through the bell 54 and sounding an alarm. This bell will, of course, be located in the office of the person in charge of the building, and the ringing of the bell will indicate to him that there is something wrong with some of the circuits making up the system. By inspecting the several supervisory relays, he can then determine which circuit is affected, and can repair it. Meanwhile, all of the other circuits of the system will remain operative.

In addition to the contacts 60', the relay 61 controls another pair of contacts 64, one of which is connected through the armature of the relay and wires 51 and 52 with the bus bar 1, and the other of which is connected by a wire 65 with one side of a signal lamp 66. The other side of this lamp is connected by wire 67 to wire 55, leading to the bus bar 2. Thus, so long as the relay 61 is energized, the contacts 64 are maintained closed and the lamp 66 will burn continuously.

In order to indicate the condition of the battery or other source of current, a volt meter 68 is preferably bridged across the terminals of the lamp circuit. Thus, by the reading of this volt meter, as well as by the brightness of the lamp, the attendant can tell at all times the condition of the battery. It will, of course, be understood that the lamp 66 and volt meter 68 are preferably located adjacent the bell 54 in the office of the person in charge of the building.

From the above, it will be obvious that I have provided a simple and effective open circuit signaling system in which the momentary closure of any station switch will result in starting automatic mechanism which transmits a given round of signals and then restores itself to normal, and in which all of the circuits are provided with supervisory means for indicating at all times whether they are in working condition, and it is thought that the many advantages of my improved system will be readily appreciated without further discussion.

What I claim is:—

1. In an electric signaling system, a control drum, a motor for driving the same, one or more safety trip devices, one or more signaling devices, separate circuits connecting said trip devices and said signaling devices with a source of current, means for starting said motor, means whereby the initial movement of said control drum serves to temporarily close the trip device circuit once, and means whereby continued rotation of the drum serves to close the signaling device circuit for a definite length of time, and to periodically repeat such closure.

2. In an electric signaling system, a control drum, a motor for revolving the same, a safety trip and a circuit therefor, signaling devices and individual circuits therefor; means for operating the motor including a master relay and a circuit therefor, a manually operable switch in the master relay circuit, the armature of the master relay acting as an operating element for the motor, means whereby the master relay is maintained energized independent of the manually operable switch, means whereby the initial movement of said control drum serves to momentarily close the trip circuit once, and other means whereby continued rotation of the drum serves to close the signaling circuits periodically and in succession, and means whereby the master relay is deenergized after a given number of such closures.

3. In an electric signaling system, a control drum, a motor for driving the same, one or more safety trip devices, one or more signaling devices, separate circuits connecting said trip devices and said signaling devices with a source of current, means for starting said motor, means whereby the initial movement of said control drum serves to temporarily close the trip device circuit once, means whereby continued rotation of the drum serves to close the signaling device circuit for a definite length of time, and to periodically repeat such closure, and means including supervisory apparatus individual to each circuit and operated from the said source of current, for indicating at a given point any derangement or failure of any part of said circuits or said devices.

4. In an electric signaling system, a source of current, a control drum, an electric motor for revolving the same, a safety trip and a circuit therefor, signaling devices and individual circuits therefor; means for closing the motor circuit including a master relay and a circuit therefor, a manually operable switch in the master relay circuit, the armature of the master relay acting as an operating element for the motor, means whereby the master relay is maintained energized independent of the manually operable switch, means whereby the initial movement of said control drum serves to momentarily close the trip circuit once, and other means whereby continued rotation of the drum serves to close the signaling circuits periodically and in succession, means whereby the master relay is deenergized after a given number of such closures, and means, including supervisory apparatus individual to each circuit and operated from said source of current, for indicating at a given point any derangement or failure of any part of said circuits, including motor, relay and said devices.

5. In an electric signaling system, a source of current, a control drum, an electric motor for revolving the same, a safety trip and a normally open circuit therefor, signaling devices and individual normally open circuits therefor, means for closing the motor circuit including a master relay and a normally open circuit therefor, a manually operable normally open switch in the master relay circuit, the armature of the master relay acting as an operating element for the motor, means whereby the master relay is maintained energized independent of the manually operable switch, means whereby the initial movement of said control drum serves to momentarily close the trip circuit once, and other means whereby continued rotation of the drum serves to close the signaling circuits periodically and in succession, means whereby the master relay is deenergized after a given number of such closures, and means, including supervisory apparatus individual to each circuit and operated from said source of current, for indicating at a given point any derangement or failure of any part of said circuits, including motor, relay and devices.

In witness whereof, I have hereunto set my hand at Rochester, New York.

FERGUS PERDUE.